(12) United States Patent
Taira et al.

(10) Patent No.: US 6,873,075 B2
(45) Date of Patent: Mar. 29, 2005

(54) MAGNETIC BEARING CONTROL DEVICE

(75) Inventors: Akiko Taira, Kanagawa (JP); Toshiharu Nakazawa, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/257,937
(22) PCT Filed: Apr. 20, 2001
(86) PCT No.: PCT/JP01/03407
§ 371 (c)(1), (2), (4) Date: Oct. 21, 2002
(87) PCT Pub. No.: WO01/82466
PCT Pub. Date: Nov. 1, 2001

(65) Prior Publication Data
US 2003/0102746 A1 Jun. 5, 2003

(30) Foreign Application Priority Data
Apr. 21, 2000 (JP) ........................ 2000-121583

(51) Int. Cl.[7] ............................... H02K 7/09
(52) U.S. Cl. ................. 310/90.5; 310/74; 310/90; 310/112; 310/113; 310/165
(58) Field of Search ................ 310/90.5, 74, 90, 310/112, 113, 165

(56) References Cited

U.S. PATENT DOCUMENTS
5,998,899 A * 12/1999 Rosen et al. ............. 310/90.5

FOREIGN PATENT DOCUMENTS
JP 10295095 * 4/1998 ............. H02P/7/63

* cited by examiner

Primary Examiner—Darren Schuberg
Assistant Examiner—Iraj A. Mohandesi
(74) Attorney, Agent, or Firm—Westerman, Hattori Daniels & Adrian, LLP

(57) ABSTRACT

A magnetic bearing control device that can operate a motor with low noise, has a simple system construction and is compact and inexpensive comprises: at least a pair of opposed electromagnets for supporting a suspended unit without contact; a motor M for rotating the suspended unit; and a controller for driving and controlling them.

A DC/DC converter 13 supplies a driving power to an inverter 14 for driving the motor M. The inverter 14 for driving the motor M uses both PWM and PAM control schemes to drive and rotate the motor M.

5 Claims, 4 Drawing Sheets

MAGNETIC BEARING CONTROL DEVICE

TECHNICAL FIELD

The present invention relates to a magnetic bearing control device that controls to suspend a unit without contact by an electromagnetic force.

BACKGROUND ART

FIG. 1 shows a construction of a conventional magnetic bearing control device of this type. An AC power from a commercial power supply 1 is input via a power factor control circuit (PFC) 2 to a DC/DC converter 3 for an inverter and a DC/DC converter 4 for the bearing. An output from the DC/DC converter 3 for the inverter is supplied to an inverter 5, and an output from the inverter 5 is supplied to a motor M. An output from the DC/DC converter 4 for the bearing is supplied to a driver 7 for the bearing and a DC/DC converter 8 for the control power supply. An output from the driver 7 for the bearing is supplied to each excitation coil 9 of at least a pair of opposed magnetic bearing electromagnets (not shown), and an output from the DC/DC converter 8 for the control power supply supplies an appropriate voltage to an electronic circuit (not shown) in the device. Thus, a unit to be suspended (not shown) is suspended by an electromagnetic force, and rotated by a torque of the motor M.

In power failures, to use a regenerative power, a power generated by the motor M controls a frequency of the inverter 5 to control a regenerative voltage to be constant, and is supplied to a backup DC/DC converter 6. An output from the backup DC/DC converter 6 is supplied to the DC/DC converter 8 for the control power supply and the driver 7 for the bearing to decelerate the suspended unit with supported without contact until a safe number of rotation (i.e. a number of rotation that allows safe support by a touchdown bearing) is reached.

When the inverter 5 is operated by a PAM (pulse amplitude modulation) control scheme in the magnetic bearing control device having the above described construction, the DC/DC converter 3 for the inverter supplies a gradually increased voltage from a start to the inverter 5, and the voltage is frequency-converted by the inverter 5 and supplied to the motor M. The PAM control scheme generally produces low noise, but has a high ripple current resulting in problems in efficiency, a torque ripple, or the like. There is also a problem of a low input power factor at low voltages.

When the inverter 5 is operated by a PWM (pulse width modulation) control scheme, the DC/DC converter 3 for the inverter supplies a constant voltage to the inverter 5, and the voltage is pulse-modulated and frequency-converted by the inverter 5 and supplied to the motor M. The PWM control scheme is generally superior in response in accelerating and decelerating operations, but inferior in noise of the motor M to the PAM control scheme.

The magnetic bearing control device having the above-described conventional construction uses a large number of converters for power supply, such as the DC/DC converter 3 for the inverter, the DC/DC converter 4 for the bearing, the backup DC/DC converter 6, and the DC/DC converter 8 for the control power supply, and, thus, there is also a problem that the device has a large size and is expensive and complex.

The present invention has been achieved in view of the above, and an object of the present invention is to provide a magnetic bearing control device that can operate a motor with low noise, has a simple system construction and is compact and inexpensive.

DISCLOSURE OF THE INVENTION

To achieve the object above, the invention according to claim 1 provides a magnetic bearing control device including:

at least a pair of opposed electromagnets for supporting a suspended unit without contact;

a motor for rotating the suspended unit; and an inverter for rotatably driving the motor, the inverter selecting between a PWM control scheme and a PAM control scheme in accordance with a driving condition of the motor.

The PWM control scheme is generally superior in response in accelerating and decelerating operations, but inferior in noise of the motor to the PAM control scheme. The PAM control scheme generally produces low noise, but has a high ripple current to cause problems in efficiency, a torque ripple and the like, and cause a low input power factor at low voltages. In the invention according to claim 1, as described above, the inverter uses both the PWM control scheme and the PAM control scheme to rotatably drive the motor. Thus, the motor is operated in the PWM control scheme in the accelerating operation and in the PAM control scheme in a rated operation, thereby allowing efficient operation with low noise.

The invention according to claim 2 provides the magnetic bearing control device according to claim 1, further including:

a driver (16) for the bearing for driving the electromagnets;

a DC/DC converter (15) for the bearing for supplying an output to the driver (16) for the bearing; and a DC/DC converter (13) for supplying a driving power to the inverter (14) and the DC/DC converter (15) for the bearing, wherein the DC/DC converter (13) outputs a voltage equal to or higher than a bearing supporting voltage required for supporting the suspended unit without contact to the DC/DC converter (15) for the bearing, and the DC/DC converter (15) outputs a constant voltage for the bearing supporting.

The invention according to claim 3 provides the magnetic bearing control device according to claim 1 or 2, wherein a change point by which the inverter selects between the PWM control scheme and the PAM control scheme is at least one of a duty ratio in the PWM and an output voltage of the inverter.

The invention according to claim 4 provides the magnetic bearing control device according to claim 1, further including:

a driver (16) for the bearing for driving the electromagnets; and a DC/DC converter (13) for supplying a driving power to the inverter (14) and the driver (16) for the bearing, wherein the DC/DC converter (13) outputs a voltage equal to a magnetic bearing supporting voltage required for supporting the suspended unit without contact to the driver (16) for the bearing.

BEST MODE FOR CARRYING OUT THE INVENTION

Figure 1:
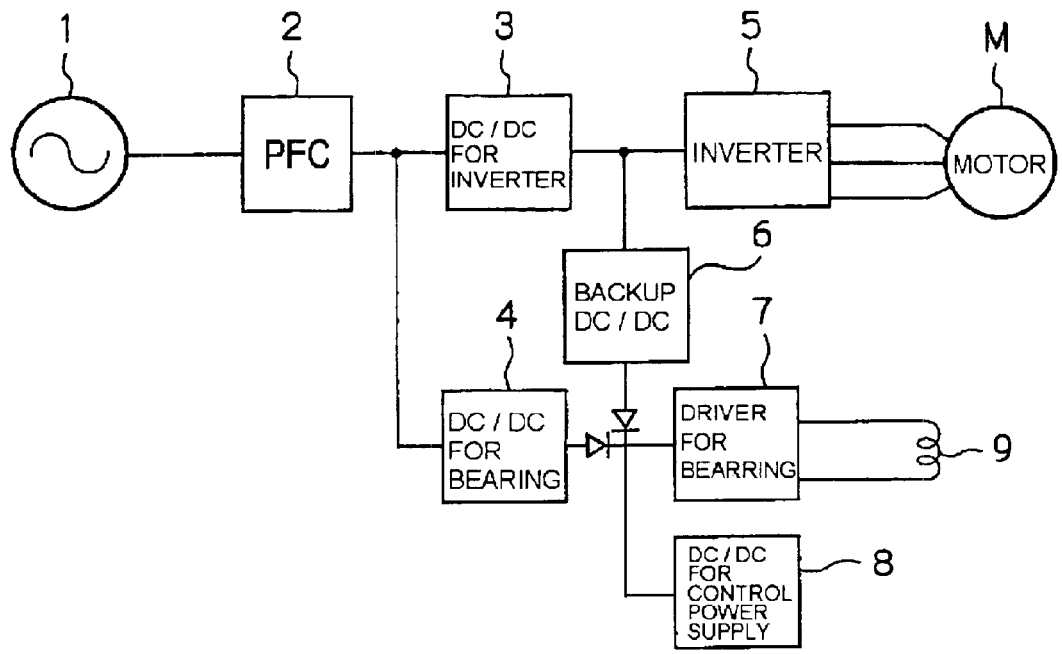
FIG. 1 shows an example of a construction of a conventional magnetic bearing control device.
Figure 2:
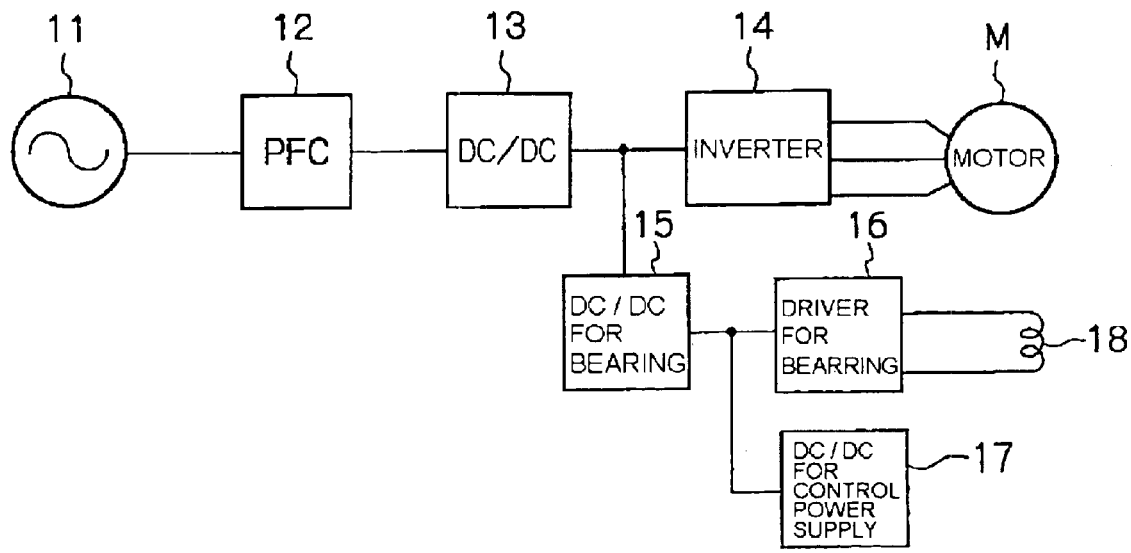
FIG. 2 shows an embodiment of a magnetic bearing control device according to the invention.

Embodiments of the invention will be described below with reference to the drawings, exemplifying a case where the invention is applied to a turbo molecular pump. FIG. 2 shows an embodiment of a magnetic bearing control device according to the invention. An AC power from a commercial power supply 11 is input via a power factor control circuit (PFC) 12 to a DC/DC converter 13. An output from the DC/DC converter 13 is supplied to an inverter 14 and a DC/DC converter 15 for the bearing. An output from the inverter 14 is supplied to a motor M. An output from the DC/DC converter 15 for the bearing is supplied to a driver 16 for the bearing and a DC/DC converter 17 for the control power supply. An output from the driver 16 for the bearing is supplied to an excitation coil 18 of a magnetic bearing electromagnet (not shown), and an output from the DC/DC converter 17 for the control power supply supplies an appropriate voltage to an electronic circuit (not shown) in the device. Thus, the unit to be suspended (not shown) is suspended without contact by an electromagnetic force and rotated by the motor M.

The output from the DC/DC converter 13 is supplied to the DC/DC converter 15 for the bearing, and the DC/DC converter 15 for the bearing outputs a constant bearing supporting voltage required for the magnetic bearing electromagnet to support the suspended unit without contact to the driver 16 for the bearing. When a voltage higher than the bearing supporting voltage is required in accelerating the motor M, the DC/DC converter 13 further increases its output voltage. However, at that time, the bearing supporting voltage output from the DC/DC converter 15 for the bearing is kept constant. That is, a minimum output voltage of the DC/DC converter 13 is a value at which the DC/DC converter 15 for the bearing can output the bearing supporting voltage required for the magnetic bearing electromagnet to support the suspended unit without contact. The inverter 14 operates in a PWM control scheme in a voltage increasing operation of the DC/DC converter 15 for the bearing (T1 to T2 in FIG. 3) or part of a load varying period (T5 to T6 in FIG. 3). The inverter 14 operates in a PAM control scheme in a voltage decreasing operation of the DC/DC converter 15 for the bearing (T4 to T5 and T6 to T7 in FIG. 3).

In power failures, to use a regenerative power, a power generated by the motor M controls the frequency of the inverter 14 to control a regenerative voltage to be constant, and is thus supplied via the inverter 14 to the DC/DC converter 15 for the bearing. An output from the DC/DC converter 15 for the bearing is supplied to the DC/DC converter 17 for the control power supply and the driver 16 for the bearing so as to decelerate the suspended unit without contact, until a safe number or rotation of the suspended unit is reached.

Figure 3:
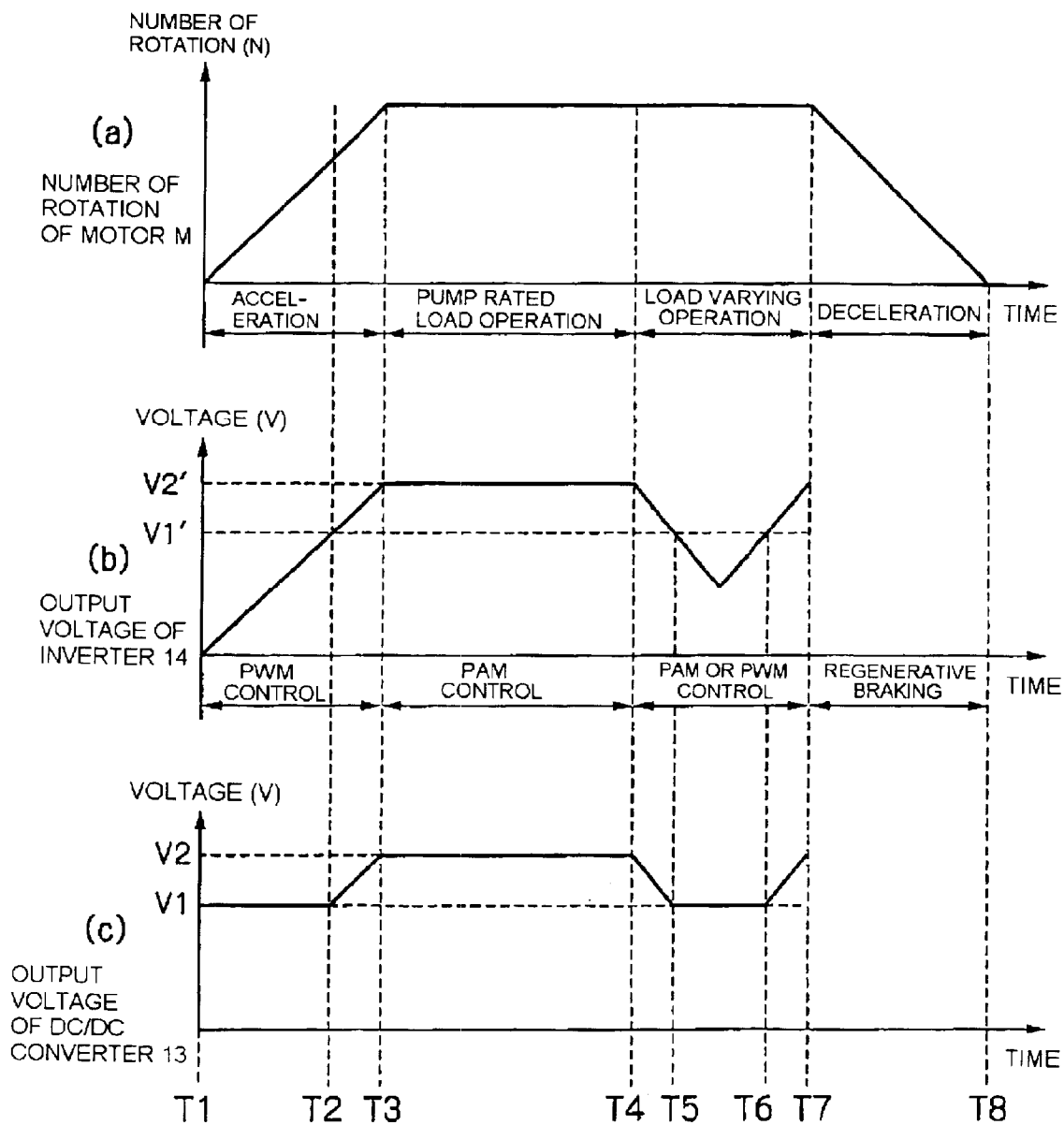
FIG. 3 illustrates the operation of the magnetic bearing control device shown in FIG. 2.

FIG. 3 illustrates an operation of the magnetic bearing control device shown in FIG. 2, FIG. 3(a) showing a number of rotation of the motor M, FIG. 3(b) showing an output voltage of the inverter 14, and FIG. 3(c) showing the output of the DC/DC converter 13. As shown in FIG. 3(c), the DC/DC converter 13 is started at time T1 to output a voltage V1 required for the magnetic bearing electromagnet to support the suspended unit without contact. Then, the motor M is accelerated, and the DC/DC converter 15 for the bearing continues outputting the bearing supporting voltage until the output from the inverter 14 reaches a voltage V1' (time T1 to T2). When the motor M is further accelerated and the motor M requires a voltage equal to or higher than the voltage at which the magnetic bearing electromagnet supports the suspended unit without contact (time T2), the DC/DC converter 13 increases its output so as to output a voltage V2 required for a rated operation of a pump load (time T3).

During period T1 to T2, the output voltage of the inverter 14 continues increasing, but the DC/DC converter 15 for the bearing outputs the constant bearing supporting voltage required for the magnetic bearing electromagnet to support the suspended unit without contact. In this period, the inverter 14 operates in the PWM control scheme and turns to the PAM control scheme at the time when a duty ratio of the PWM reaches a maximum.

After the duty ratio of the PWM reaches the maximum (time T2), and in a rated operation period of the pump load (time T3 to T4), the inverter 14 operates in the PAM control scheme and controls the output voltage.

In the load varying operation period (time T4 to T7), the inverter 14 operates in the PAM control scheme in a period when its output voltage is equal to or higher than V1' (T4 to T5 and T6 to T7) and in the PWM control scheme in a period when its output voltage is lower than V1' (time T5 to T6) so as to control the output voltage. However, in the load varying operation period, the control scheme of the inverter 14 switches from the PWM to the PAM when the duty ratio of the PWM reaches the maximum, and switches from the PAM to the PWM when the duty ratio of the PWM becomes equal to or lower than the maximum.

In a power failure (time T7 to T8), the motor M is decelerated by regenerative braking, as described above.

Figure 4:
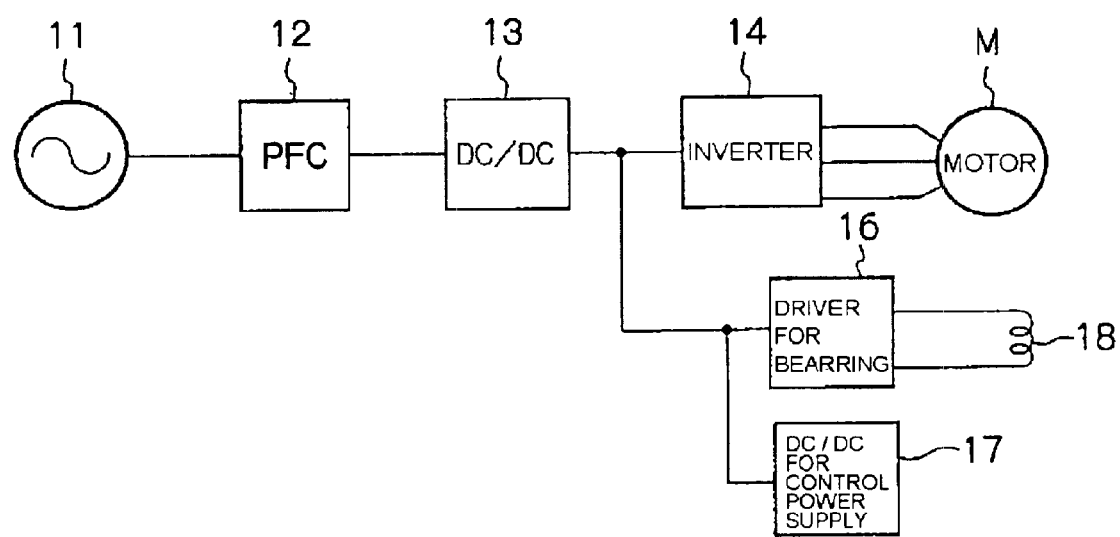
FIG. 4 shows another embodiment of a magnetic bearing control device according to the invention.

FIG. 4 shows another embodiment of a magnetic bearing control device according to the invention. An AC power from a commercial power supply 11 is input via a power factor contorol circuit (PFC) 12 to a DC/DC converter 13. An output from the DC/DC converter 13 is supplied to an inverter 14, a driver 16 for the bearing and a DC/DC converter 17 for the control power supply. An output from the inverter 14 is supplied to a motor M. An output from the driver 16 for the bearing is supplied to an excitation coil 18 of a magnetic bearing electromagnet (not shown). An output from the DC/DC converter 17 for the control power supply supplies an appropriate voltage to an electronic circuit (not shown) in the device. Thus, a unit to be suspended (not shown) is suspended without contact by an electromagnetic force and rotated by the motor M.

The DC/DC converter 13 outputs, to the driver 17 for the bearing, a bearing supporting voltage required for the magnetic bearing electromagnet to support the suspended unit without contact. The inverter 14 receives the bearing supporting voltage and operates in a PWM control scheme in accelerating the motor M and in a PAM control scheme in a rated operation of a pump load.

In power failures, to use a regenerative voltage, a power generated by the motor M controls the frequency of the inverter 14 to control the regenerative voltage to be constant, and is thus supplied via the inverter 14 to the DC/DC converter 17 for the control power supply and the driver 16 for the bearing to decelerate the suspended unit without contact until a safe number of rotation of the suspended unit is reached.

Figure 5:
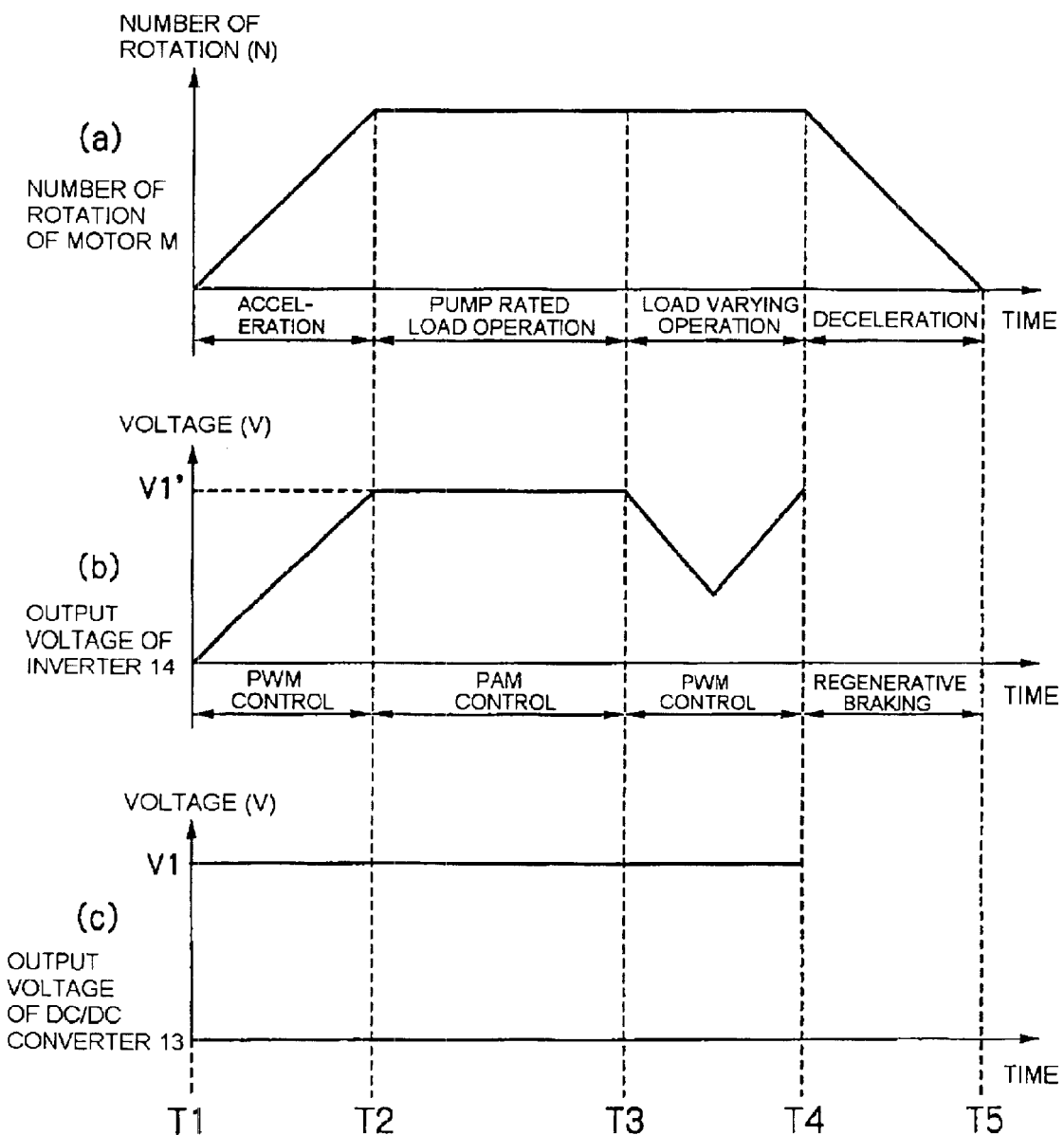
FIG. 5 illustrates the operation of the magnetic bearing control device shown in FIG. 4.

FIG. 5 illustrates the operation of the magnetic bearing control device shown in FIG. 4, FIG. 5(a) showing a number of rotation of the motor M, FIG. 5(b) showing an output voltage of the inverter 14, and FIG. 5(c) showing the output of the DC/DC converter 13. As shown in FIG. 5(c), the DC/DC converter 13 outputs, to the inverter 14, the driver 16 for the bearing and the DC/DC converter 17 for the control power supply, a constant voltage V1 required for the magnetic bearing electromagnet to support the suspended unit without no contact. In accelerating the motor M (time T1 to T2), the inverter 14 operates in the PWM control scheme until its output voltage reaches V1' (time T2) and controls the output voltage. In the rated operation of the pump load (time T2 to T3), the inverter 14 operates in the PAM control scheme and maintains the output voltage V1'.

In a load varying operation (time T3 to T4), the inverter 14 operates in the PWM control scheme and controls the output voltage. In power failure (time T4 to T5), the motor M is decelerated by regenerative braking.

As described above, according to the embodiments of the magnetic bearing control device of the invention, the inverter 14 operates in the PWM control scheme in the accelerating operation of the motor M and in the PAM control scheme in the rated operation of the pump load, thus allowing the motor M to operate efficiently with low noise. It is noted that the present invention is not limited to the above described two embodiments, but various modifications and changes may be made by those skilled in the art without departing from the spirit and scope of the invention. For example, detection means for detecting a position of the suspended unit may be provided in both of the embodiments.

Industrial Applicability

In a magnetic bearing control device according to the invention, as described above in detail, the inverter uses both PWM and PAM control schemes to drive and rotate the motor. Thus, the motor is operated in the PWM control scheme in the accelerating operation of the motor and in the PAM control scheme in the rated operation, thereby allowing efficient operation of the motor with low noise. Therefore, the present invention can be applied to vacuum pumps such as turbo molecular pumps.

What is claimed is:

1. A magnetic bearing control device comprising:
   at least a pair of opposed electromagnets for supporting a suspended unit without contact;
   a motor for rotating said suspended unit; and
   an inverter for driving said motor, said inverter selecting between a pulse width modulation (PWM) control scheme and a pulse amplitude modulation (PAM) control scheme in accordance with a driving condition of said motor.

2. The magnetic bearing control device according to claim 1, further comprising:
   a driver (16) for the bearing for driving said electromagnets;
   a DC/DC converter (15) for the bearing for supplying an output to said driver (16) for the bearing; and
   a DC/DC converter (13) for supplying a driving power to said inverter (14) and said DC/DC converter (15) for the bearing,
   wherein said DC/DC converter (13) outputs, to said DC/DC converter (15) for the bearing, a voltage equal to or higher than a bearing supporting voltage required for supporting said suspended unit without contact, and wherein said DC/DC converter (15) outputs a constant voltage for the bearing supporting.

3. The magnetic bearing control device according to claim 1 or 2, wherein a change point by which said inverter selects between the pulse width modulation (PWM) and pulse amplitude modulation (PAM) control schemes is at least one of a duty ratio in the PWM and an output voltage of said inverter.

4. The magnetic bearing control device according to claim 1, further comprising:
   a driver (16) for the bearing for driving said electromagnets; and
   a DC/DC converter (13) for supplying a driving power to said inverter (14) and said driver (16) for the bearing,
   wherein said DC/DC converter (13) outputs, to said driver (16) for the bearing, a voltage equal to a magnetic bearing supporting voltage required for supporting said suspended unit without contact.

5. A control device for a magnetic bearing having at least a pair of opposed electromagnets for supporting a suspended unit without contact and a motor for rotating the suspended unit; said control device comprising:
   an inverter for driving said motor, said inverter selecting between a pulse width a modulation (PWM) control scheme and a pulse amplitude modulation (PAM) control scheme in accordance with a driving condition of said motor; and
   a DC/DC converter for supplying a driving power to said inverter.

* * * * *